March 27, 1962 — L. H. BRAKEL ET AL — 3,027,147
CIRCULAR SHAFT KILN DISCHARGE GRATE
Filed May 6, 1959 — 4 Sheets-Sheet 1

INVENTORS
LEWIS H. BRAKEL
JOHN B. JONES, JR.
BY
ATTORNEY.

March 27, 1962   L. H. BRAKEL ET AL   3,027,147
CIRCULAR SHAFT KILN DISCHARGE GRATE
Filed May 6, 1959   4 Sheets-Sheet 2

INVENTORS,
LEWIS H. BRAKEL.
BY JOHN B. JONES, JR.
ATTORNEY.

March 27, 1962 L. H. BRAKEL ET AL 3,027,147
CIRCULAR SHAFT KILN DISCHARGE GRATE
Filed May 6, 1959 4 Sheets-Sheet 3

INVENTORS
LEWIS H. BRAKEL.
BY JOHN B. JONES, JR.
ATTORNEY.

March 27, 1962  L. H. BRAKEL ET AL  3,027,147
CIRCULAR SHAFT KILN DISCHARGE GRATE Filed May 6, 1959  4 Sheets-Sheet 4

INVENTORS
LEWIS H. BRAKEL.
BY JOHN B. JONES, JR.

*Homer J. Sweet*
ATTORNEY.

United States Patent Office
3,027,147
Patented Mar. 27, 1962

3,027,147
CIRCULAR SHAFT KILN DISCHARGE GRATE
Lewis H. Brakel, Seattle, Wash., and John B. Jones, Jr., near Denver, Colo., assignors to Cameron and Jones, Incorporated, Denver, Colo., a corporation of Colorado
Filed May 6, 1959, Ser. No. 811,306
13 Claims. (Cl. 263—29)

This invention relates to continuous gravity-flow kilns and furnaces of broadly-conventional type economically advantageous of extensive use in the processing, conditioning, and treatment of diverse solid materials in crushed, broken, or equivalent discrete state, and more particularly to the facilities and agencies appurtenant to such kilns and furnaces for the regulation and control of gravity-induced flow of material therethrough, and has as an object to provide a novel and improved discharge grate organization efficiently coactable with such kilns and furnaces to attainment of enhanced operative advantage.

A further and important particular object of the invention is to provide a novel and improved discharge grate organization efficiently coactable with and to operatively compose gravity-flow kilns and furnaces transversely-circular in form.

A further significant particular object of the invention is to provide a novel and improved discharge grate organization adapted for efficient coaction with transversely-circular gravity-flow kilns and furnaces of widely-diverse diametric sizes and capacities.

A further salient object of the invention is to provide a novel and improved discharge grate organization effective in coaction with transversely-circular gravity-flow kilns and furnaces to promote uniformity of continuous component distribution and movement throughout the entire charge of material under treatment therein.

A further notable object of the invention is to provide a novel and improved discharge grate organization effective in coaction with transversely-circular gravity-flow kilns and furnaces to regulably control and determine the rate of uniformly-continuous material flow therethrough.

A further material object of the invention is to provide a novel and improved discharge grate organization effective in coaction with transversely-circular gravity-flow kilns and furnaces to regulably promote uniformity of continuous diffusion and transmission of applied fluid agents throughout the entire charge of material under treatment therein.

A further object of the invention is to provide a novel and improved discharge grate organization effective in coaction with transversely-circular gravity-flow kilns and furnaces to regulably introduce fluid treating agents beneath and for continuously-uniform diffusion and uprise throughout the entire charge of material therein.

A further object of the invention is to provide a novel and improved discharge grate organization effective in coaction with transversely-circular gravity-flow kilns and furnaces to regulably introduce fluid treating agents at a predetermined intermediate level within and for continuously-uniform diffusion and uprise throughout the superincumbent portion of the charge of material therein.

A further object of the invention is to provide a novel and improved discharge grate organization automatically accommodative in coaction with transversely-circular gravity-flow kilns and furnaces of temperature variations incident to operation thereof.

A further object of the invention is to provide a novel and improved discharge grate organization selectively regulable in functioning coaction with transversely-circular gravity-flow kilns and furnaces to adjustably control the rate of material flow therethrough.

A further object of the invention is to provide a novel and improved construction and operative correlation of elements constituting a discharge grate organization coactable with transversely-circular, gravity-flow kilns and furnaces.

A further object of the invention is to provide a novel and improved discharge grate organization for transversely-circular gravity-flow kilns and furnaces that is expedient of production in diverse structural particularity suited to the requirements of specific installations and processing techniques, that is operatively responsive to any preferred one of many conventional powering facilities, that exacts a minimum of maintenance during a long life of practical utility, and that is positive and efficient in attainment of the ends for which designed.

With the foregoing and other objects in view, our invention consists in the construction, arrangement, and operative combination of elements as hereinafter set forth, pointed out in our claims, and illustrated by the accompanying drawings, in which—

Kilns and furnaces adapted to accommodate a continuous gravity-induced flow of discrete solids material therethrough in exposure to fluids, notably gases, commonly applied in a countercurrent direction of flow to permeate and react with such material have long been known and utilized for the processing and treatment of many specific substances. Appropriately styled shaft kilns, such structures are extensively employed in many industrial adaptations and varied constructions to effect thermal reactions promoted by means of hot gases whereof the efficacy is in large measure determined by the regulability and uniformity of solids movement through and at all zones transverse of the kiln and the regulability and uniformity of gas movement permeating the solids charge at all zones transverse thereof, which significant factors are variably contingent upon the transverse conformation of the kiln, the character and operational properties of the arrangements for regulably effecting solids discharge from the kiln, and the means for regulably introducing gases to the kiln and its charge.

Considerations of economy, practicality, and operative efficiency strongly favor as superior a tubular, or transversely-circular, shaft kiln conformation as distinguished from the transversely-rectangular such units heretofore prevalent, but the arrangements for solids discharge from and gas introduction to the tubular shaft kilns of moderate diameter hitherto devised have proved to be unsatisfactory and no adaptation of any such arrangements to tubular shaft kilns of extensive diameter and consequent large capacity are known to exist, hence the instant invention is directed to the provision of a novel and improved grate structure and organization uniquely coactable with and to regulate solids discharge from and gas introduction to transversely-circular, or tubular, shaft kilns of preferred diametric size within a broad expedient range in a manner to realize the practical advantages of such kilns with economy, efficiency, and reliable utility.

Figure 1:
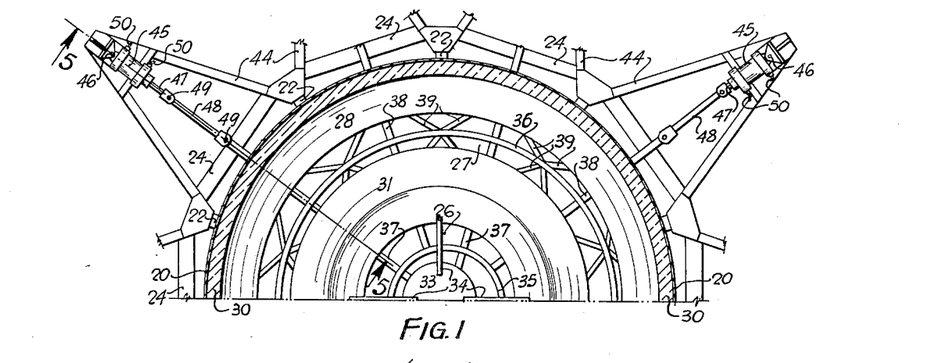
FIGURE 1 is a half transverse section through a transversely-circular shaft kiln showing in top plan the corresponding features of an associated typical exemplification of the invention appropriate for effective coaction with kiln and furnace units of moderate diameter.
Figure 2:
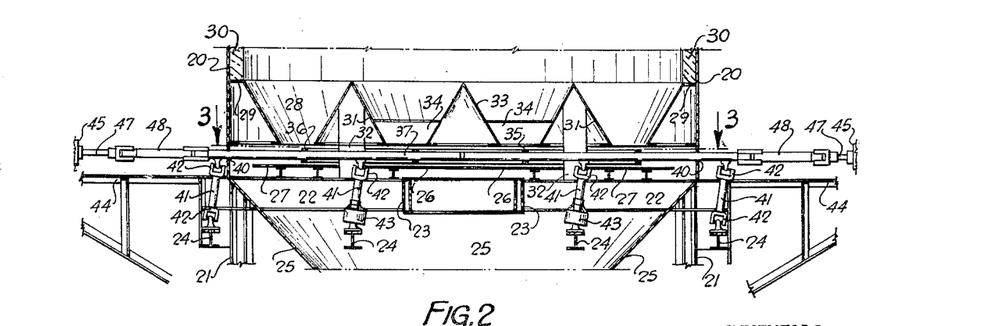
FIGURE 2 is a somewhat diagrammatic section axially through the arrangement according to FIGURE 1, structural elements not essential to an understanding of the invention being omitted.
Figure 3:
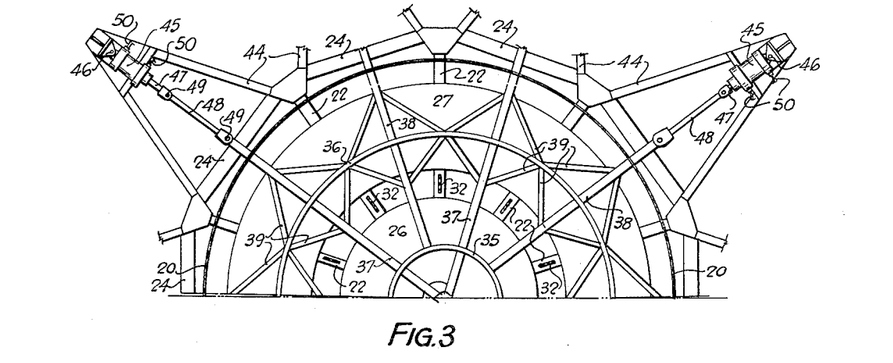
FIGURE 3 is half transverse section similar to FIGURE 1 taken substantially on the indicated line 3—3 of FIGURE 2.
Figures 4, 5:
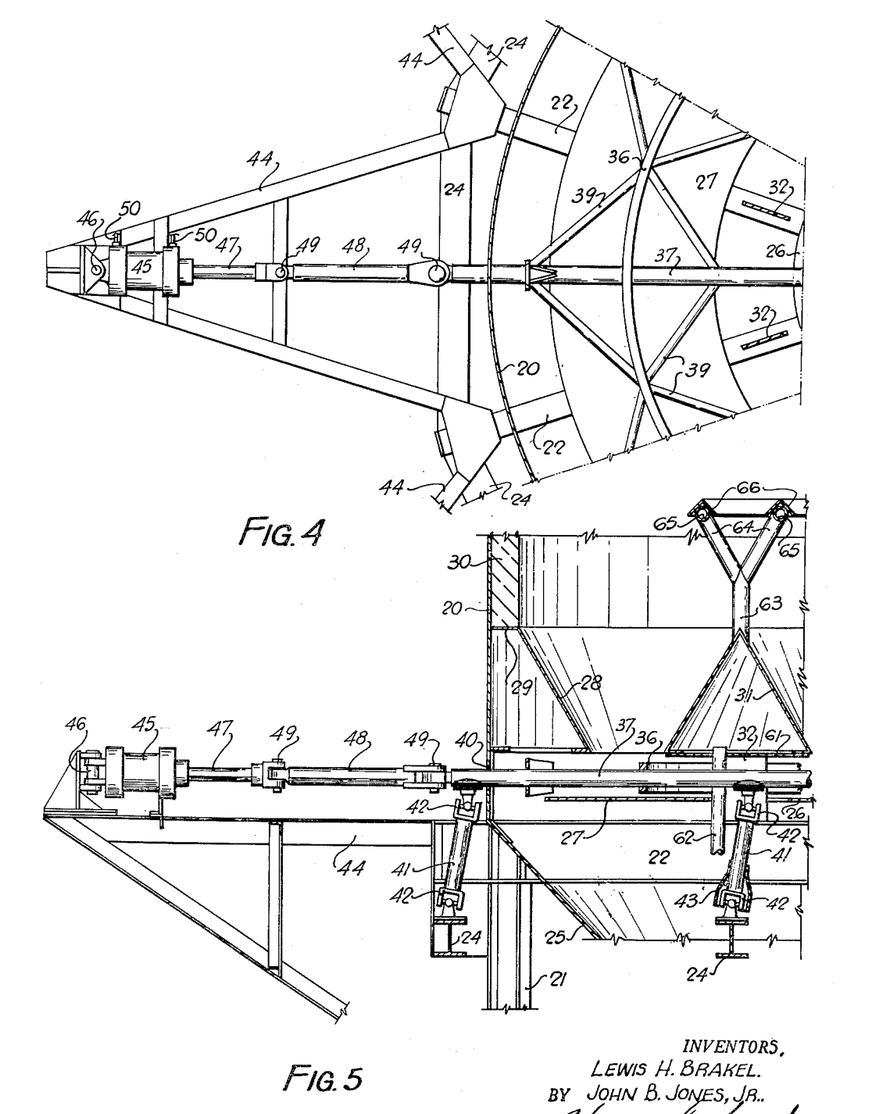
FIGURE 4 is a fragmentary, detail plan view, on a relatively enlarged scale, of a segment of the organization according to FIGURE 3.
FIGURE 5 is a fragmentary, detail section, on a relatively enlarged scale, taken axially through and substantially on the indicated line 5—5 of FIGURE 1.

FIGURES 1 to 5, inclusive, of the drawings exemplify structure appropriate to give practical effect to the principles of the invention in operative association with transversely-circular shaft kilns of moderate diameters on the order of eighteen feet typified by the representation of an axially-vertical, tubular shell 20 of appropriate rigid material and any expedient construction. Fixedly supported in desired position of use on a rigid skeleton frame comprised from vertical columns 21, inwardly-convergent radial beams 22 closing to a central ring beam 23, and chordally-disposed beams 24 integrated with the columns and radial beams, the shell 20 is conventionally arranged at its upper end to receive continuous delivery of solids material for treatment therein and to vent gases uprising therethrough and is conventionally constituted at its lower end, as by means of a downwardly-convergent hopper bottom 25, to effect directed discharge of treated solids material and to govern admission of treating fluids.

Giving effect to the principles of the invention in broad analogy with known general practice in the related field, the lower end of the shell 20 is laterally obstructed by a discharge grate organization capable of regulating gravity-induced flow of solids downwardly therethrough in exposure to treating fluids amenable to flow control thereby, which grate organization in a realization of the purposes and advantages of the instant invention is characterized by a distinctive fixed structure and a complementary movable structure uniquely constituted and coactable as hereinafter detailed.

Significant to all practical adaptations and operative embodiments of the invention is the provision as a feature of the fixed structure of the discharge grate of flat, rigid, annular, retarder plates fixedly supported, as by the radial frame beams 22, in relatively-spaced, coplanar relation concentrically within and transversely of the lower end of the shell 20 to close across and obstruct the major area thereof. In the arrangement according to FIGURES 1–5, inclusive, an inner retarder plate 26 of a greater diameter less than the radius of the associated shell defines a central opening having a diameter on the order of one-seventh that of the plate outer circumference and is fixed concentrically within and transversely of the shell 20 coplanar with an outer retarder plate 27 of a radial width desirably the same as that of the plate 26 sized and fixedly positioned to spacedly circumscribe the latter at an interval radially equivalent to the diameter of opening centrally of the plate 26 and to establish an open annular zone between the perimeter of said plate 27 and the adjacent wall of the shell 20 radially somewhat less than the interval between said plates. The fixed structure of the discharge grate of the invention is completed by means of an array of deflectors rigidly disposed to register with and to close over the annular interruptions, through, between, and about the retarder plates 26 and 27 in overhanging, spacedly-superjacent relation therewith. While it is apparent that the deflectors utilized to cover the interruptions opening through the shell floor constituted by the retarder plates 26 and 27 may be of widely diverse particularity, their manifest function of uniformly dividing and directing gravity-induced flow of solids within the shell 20 to uniform and balanced concentration upon and against the upwardly-exposed surfaces of the retarder plates is advantageously promoted by the arrangements illustrated and now to be described. Designed to inhibit direct escape of charge components through the annular zone between the shell 20 and the retarder plate 27, a frusto-conical skirt 28 furnished with an outwardly-directed, annular flange 29 radially of its greater base depends from attachment of the outer margin of said flange 29 to the interior wall of the shell 20 at an inclination inwardly and downwardly of the latter such as to position the lower, inner margin of said skirt in a plane parallel to and spaced upwardly from that of the retarder plates 26 and 27 and in a radially-inward, overhanging correlation with the perimeter of the retarder plate 27 effective to retain at the natural angle of repose on the subjacent area of said plate the portion of a solids material charge deflected and directed thereby. The lowermost annular zone of the skirt 28 transverse of the shell may be open or closed, as may be deemed to be expedient or desirable, and may be braced, reinforced, or conditioned as found to be appropriate, and the annular flange 29 in its horizontal, inward projection from the associated shell 20 provides a convenient and practical seat and support for a cylindrical, refractory lining 30 customarily applied to protect the interior wall of the shell subject to high temperatures and other corrosive and erosive influences. Complementing and supplementing the charge deflecting and directing influence of the skirt 28 as exemplified at the retarder plate 27 with inhibition of direct escape of charge components through the interval separating the retarder plates 26 and 27, an annular deflector unit 31 of isosceles-triangular form in radial section is provided in an altitude of its triangular section substantially the same as the vertical extent of the skirt 28, a diameter at the apex of its triangular section corresponding with that of the circle bisecting the interval between the retarder plates 26 and 27, and a width of its triangular section base, radially of the unit, closely approximating twice the radial overlap of the skirt 28 relative to the retarder plate 27 plus the radial width of the interval between the plates 26 and 27, which unit 31 is securely affixed, as by means of struts 32 upstanding from the radial beams 22 through the interval separating the plates 26 and 27, with the circular apex of its triangular section coplanar with the flange 29 of the skirt 28 in registration with and spacedly above the circle bisecting the interval separating the plates 26 and 27, whereby to dispose the triangular section base of said unit 31 coplanar with the lowermost annular zone of the skirt 28 superjacent and in closing relation over the open interval separating the plates 26 and 27 and to radially overlap spacedly-adjacent, annular zones of said plates like distances corresponding to the overlap of the skirt 28 relative to the plate 27. Completing the deflector array correlated with the plates 26 and 27, an isoscles cones 33 of axial section the same as the triangular section of the unit 31 is supported, by means of arms 34 fixedly attaching the same to the inner conical wall of the unit 31, in coaxial relation with the shell 20 to dispose its apex in the plane defined by the flange 39 and apex circle of the unit 31 and its base coplanar with lower elements of said skirt and unit, whereby to register the base of said cone 33 with and spacedly above the central opening through the plate 26 in an overlap of the cone base margin relative to the underlying annular zone of said plate corresponding in radial extent to the similar overlap characterizing the skirt 28 and unit 31. Obviously, the bases of the unit 31 and cone 33 may be open or closed, such features may be braced, reinforced, and conditioned as deemed to be expedient, and, together with the skirt 28, such features may be applied for introduction and dispersion of treating fluids when closed at their bases to function as ducts.

Organized as shown and described, the deflector array defines annular, downwardly-convergent throats similarly and symmetrically opening to annular, central zones of like radial widths on the plates 26 and 27, all in a manner to promote uniform, gravity-induced flow of the charge confined by the shell 20 throughout transverse areas of the latter and to accumulate on the central zones of the retarder plates 26 and 27 like amounts of the charge retained against escape over the free margins of said plates at the natural angle of repose of the charge material.

Uniquely actuable to dislodge and discharge solids material accumulated on the retarder plates 26 and 27 through the annular throats at the opposite sides of the deflector unit 31, the movable structure hereinabove mentioned is disposed and arranged for operation transversely of the shell 20 in the space between the plane of the retarder plates 26 and 27 and the plane common to the bases and lower margins of the deflector components 28, 31 and 33. In an organization appropriate for coaction with transversely-circular shaft kilns, the movable structure is featured by an inner discharger ring 35 diametrically coextensive with the median circle of the retarder plate 26 and of axial dimension less than the spacing between the planes common to the retarder plates and base areas of the deflector assembly, which ring 35 is fixedly and concentrically associated with a second discharge ring 36 diametrically coextensive with the median circle of the retarder plate 27 in an axial dimension the same as that of the ring 35. The rings 35 and 36 are integrated in laterally-coplanar, concentric association as elements of the movable structure by means of a plurality of identical arms 37 radially through and fixed to said rings in appropriate number and angular separation, which arms 37 expediently converge to a common junction centrally of the ring 35, and by means of similar arms 38 supplementing the arms 37 in bisecting relation with the spaces separating adjacent units of the latter and extending radially of the ring assembly from fixed end engagement with the ring 35 to and fixedly through the ring 36, said arms 37 and 38 being braced to and for reinforcement of either or both of the associated rings, as indicated by the struts 39, in accordance with applicable known engineering principles. The arms 37 and 38 are of like extent radially and outwardly of the assembly and exceed in effective length the radius of the shell 20, through which latter said arms are freely accommodated in ports 40 intersecting said shell in some elongation peripherally thereof, whereby to dispose an outer end of each arm 37 and 38 exteriorly of the shell. The movable structure comprised from the rings 35, 36 and the arms 37, 38 is supported for actuation out of contact with the retarder plates 26 and 27 by a plurality of like, oscillable, rigid links 41 operatively engaged between fixed elements, such as the beams 24, of the frame supporting the shell 20 and appropriate superjacent points of the arms 37 and 38. In any expedient structural particularity, each of the links 41 characterized by a universal joint 42 at each of its ends fixedly connectible, respectively, with the fixed support, such as a beam 24, and an appropriate zone of the arm 37 or 38 thereby supported. As illustrated, each of the arms 37 and 38 is engaged by two links 41, one of which is arranged to support the end of the associated arm exterior to the shell 20 and the other of which is arranged to traverse the interval between the retarder plates 26 and 27 for attachment to the arm zone thereabove, in which arrangement the lower universal joint 42 of the links 41 engaging through the interval between the retarder plates is hooded, as at 43, in any manner appropriate to shield the joint from contact with solids material discharged through said interval. The links 41 are sized and arranged to support the movable structure for free floating actuation in the space between the plane of the retarder plates and that common to the bases of the deflector elements, and to permit orbital shift of the movable assembly within a limited range relative to and out of contact with any of the elements of the fixed structure to which it is complementary, all of which is practical and expedient in an arrangement effective to dispose the rings 35 and 36 concentric with the shell 20 when the links 41 supporting the arms 37 and 38 are substantially vertical.

It is the function of the rings 35 and 36 to discharge collected solids material from and over the opposite free margins of the retarder plates 26 and 27, respectively, as the movable structure characterized by said rings is shifted away from concentric relation with said plates, and considerations of efficient kiln operation require uniform and balanced displacement of accumulated solids from and circumferentially about the retarder plates as a prerequisite to uniform flow of material through the shell 20 and throughout the transverse shell areas, and the movable structure characterized by the rings 35 and 36 is hence uniquely powered to effect a continuous, orbital displacement thereof through means and in a manner amenable to selective control and regulation. Obviously variable as to the powering instrumentalities utilized and the structural operative adaptation thereof, a practical arrangement for powering the movable structure to effect the purpose and realize the advantages of the invention is typically represented as characterized by a rigid frame bay 44 extending radially and outwardly from the frame supporting the shell 20 in alignment with and slightly below the end of each arm 37 and 38 exterior to said shell, and a power-transmitting unit 45, such as an hydraulic ram, operatively supported on and at the outer end of said bay 44 in position to apply power to and for longitudinal displacement of the associated arm 37 or 38. When utilizing an hydraulic ram 45 for power transmission, it is practical to hingedly link the closed end of the ram cylinder to a fitting at the outer end of the bay 44 for articulation about a vertical axis represented by the pin 46 and to hingedly connect the piston rod 47 of the ram to the opposed end of the arm 37 or 38 substantially aligned therewith by means of a rigid link 48 articulated at each end on vertical axes represented by the pins 49, whereby to accommodate displacement of the elements so interlinked angularly of the shell 30 incident to orbital actuation of the movable structure. With an hydraulic unit 45 linked to each of the arms 37 and 38 of the movable structure, it is feasible to power said units from any suitable source or supply of fluid under pressure, as through flow lines 50, in a manner effective to progressively retract the piston rods of successive such units circumferentially of the shell with consequent orbital shift of the rings 35 and 36 relative to the median circles of the associated retarder plates and within the accumulation of solids imposed upon said plates, whereby to urge such solids progressively, uniformly, and gradually to discharge over first one and then the other of the retarder plate free margins as said rings move with the associated structure through eccentric correlations with the retarder plates and the circular throats thereover. Fluid pressure systems effective through automatic means and controls to progressively power the hydraulic units 45 of the orbital array thereof illustrated and hereinabove described are known and have been heretofore utilized to an extent precluding any occasion for elaboration herein, it being manifest that usual skill of the art should easily suffice to couple all of the units 45 applicable to shift of the movable assembly with an appropriate source or supply of fluid pressure in a manner to effectuate orbital shift of the movable structure in a rolling eccentricity with the associated retarder plates through means selectively manipulable and adjustable to vary and determine the rate and amount of such actuation.

With a range of movable structure actuation through the agency of the units 45 effective to displace the rings 35 and 36 eccentrically of the related retarder plates a distance preferably somewhat less than the open area of the annular throat immediately thereabove, said rings work in the accumulation of solids material imposed upon the plates to establish and maintain a continuous and uniform discharge of the material over the plate free margins without any way impeding the continuous uniform supply of such material from the superjacent charge. Material discharged over the retarder plate margins is received in hopper 25, or in any preferred expedient structure, for flow thence to conveyors or analogous translating means of conventional type and function; introduction of treating fluids to the kiln charge through the annular throats characterizing the fixed deflector structure, or otherwise, being susceptible of attainment through known agencies and techniques suited to the processing operation characterizing a particular use of the kiln.

Figure 6:
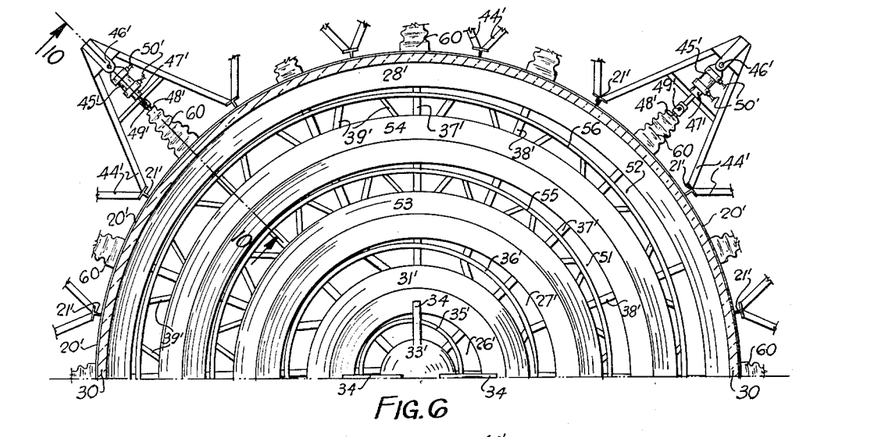
FIGURE 6 is a half transverse section similar to FIGURE 1 showing in top plan a typical, practical adaptation of the principles of the invention to use in and with kiln and furnace units of extensive diameter.
Figure 7:
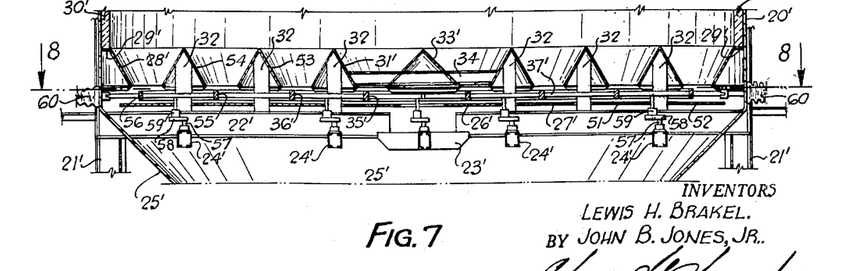
FIGURE 7 is a section similar to FIGURE 2 axially through the arrangements according to FIGURE 6.
Figure 8:
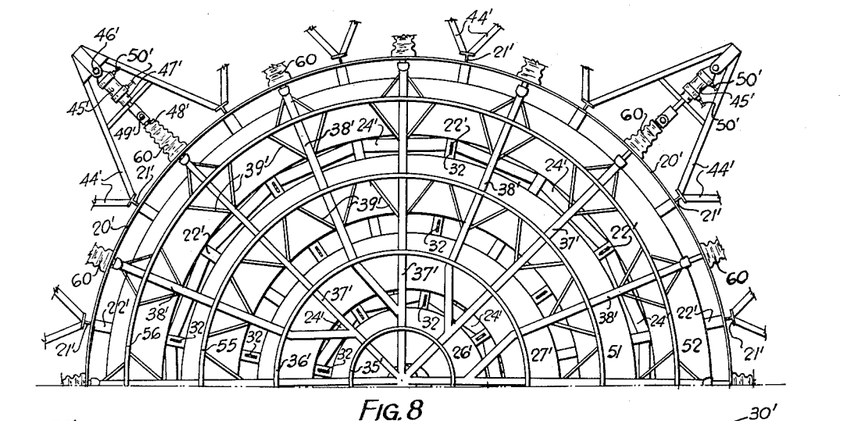
FIGURE 8 is a half transverse section similar to FIGURE 6 taken substantially on the indicated line 8—8 of FIGURE 7.
Figure 9:
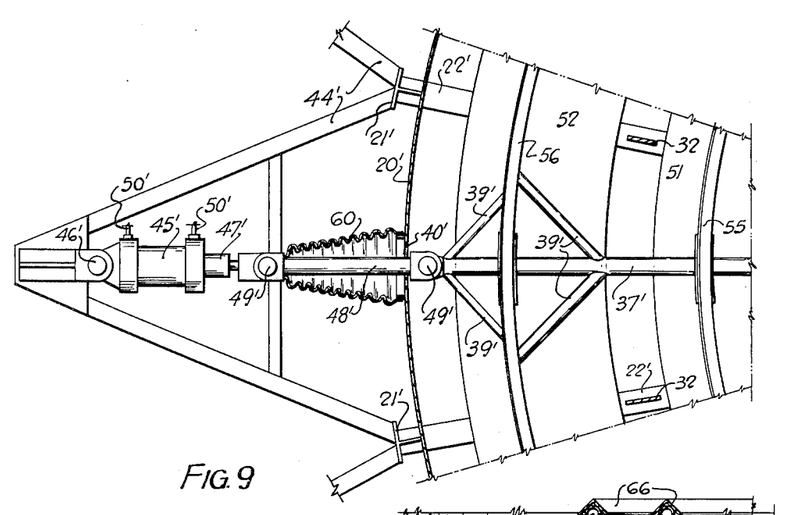
FIGURE 9 is a fragmentary, detail plan view, on a relatively enlarged scale, of a segment of the organization according to FIGURE 8.
Figure 10:
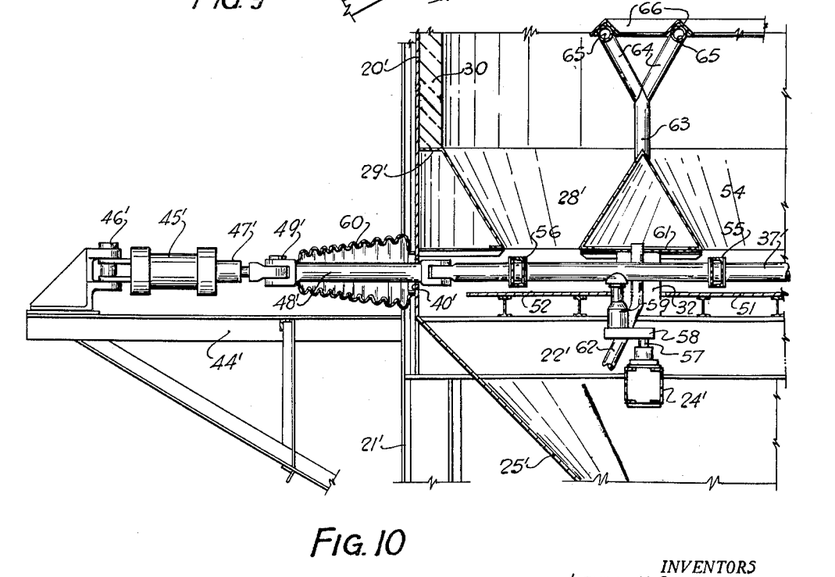
FIGURE 10 is a fragmentary, detail, section, on a relatively enlarged scale, taken axially through and substantially on the indicated line 10—10 of FIGURE 6 as supplemented and modified within the contemplation of the invention.

The adaptation of the invention to use with shaft kilns of relatively-extensive diameter and consequent large capacity typified by FIGURES 6–10, inclusive, of the drawings is the functional equivalent of the organization hereinabove described and differs structurally from the latter in but those variations and refinements of detail requisite to preserve the operating advantages of the improvement in a dimensionally-expanded environment. In the views of the drawings last noted, a large-capacity shaft kiln is represented by the axially-vertical shell 20′ equivalent in all functional respects with the shell 20 of the earlier-described embodiment save for a relatively much greater diameter, which shell 20′ is supported in its operative position by a rigid frame comprised from vertical columns 21′, inwardly-convergent radial beams 22′ closing to a central spider 23′ analogous to the ring beam 23, and chordally-disposed beams 24′ integrated with the columns and radial beams. Arranged to receive continuous delivery of solids material as hereinabove set forth and to direct discharge of treated solids material through the agency of a hopper bottom 25′, the shell 20′ accommodates and is transversely obstructed at its lower end by a fixed structure comprised from spaced, concentric, coplanar retarder plates spaced subjacent a spacedly-concentric array of deflector units, analogous to the fixed structure of the first-comprised embodiment, and operatively accommodates a movable structure co-actable with and to effect discharge from the associated retarder plates in operative analogy with the structure and operative associations characterizing the grate organization hereinabove detailed. In addition to the centrally-apertured, annular retarder plate 26′ corresponding with the plate 26 as hereinabove set forth and the spacedly-concentric, coplanar annular plate 27′ corresponding with the earlier-described plate 27, the grate organization appropriate for the large-diameter kiln includes a third annular retarder plate 51 concentric and coplanar with the plate 27′ in a spacing outwardly therefrom and a fourth annular retarder plate 52 concentric and coplanar with the plate 51 in a spacing outwardly therefrom and inwardly from the surrounding wall of the shell 20′, all of which retarder plates are fixedly supported in a disposition transverse of the shell to establish intervals therethrough and therebetween of approximately-equivalent discharging capacity for solids material displaced over the plate free margins. Structurally and functionally equivalent to the deflector array of the grate organization first described, the deflector arrangement completing the fixed structure appropriate for a large-diameter kiln includes a frusto-conical skirt 28′ furnished with a radial flange 29′ closing to the inner wall surface of the shell 20′ in an arrangement and skirt disposition effective to relate the lower inner margin of said skirt in upwardly-spaced, overlapping relation with the outer peripheral zone of the retarder plate 52, substantially as explained in connection with the skirt 28 and retarder plate 27, a central cone 33′ axially registered with and fixedly supported spacedly above the central aperture of the retarder plate 26′ in a correlation with the skirt 28′ equivalent to that characterizing the cone 33 and skirt 28, a first annular deflector unit 31′ triangular in radial section fixedly supported superjacent and in covering relation with the interval separating the plates 26′ and 27′ with its apex circle in registration with the circle bisecting said interval, and corresponding annular deflector units 53 and 54, of appropriate diameter, fixedly supported superjacent and in covering relation with the intervals separating the plates 27′, 51 and 51, 52, respectively, in registration of their apex circles with the circles bisecting said intervals. With the elements 33′, 31′ 53 and 54 suitablly and fixedly supported in the recited correlation with the retarder plates and so as to register their apices in the plane of the skirt flange 29′ and their bases in the plane of the lower annular area of the skirt 28′, the deflector array including said elements establishes a series of concentric, annular, downwardly-convergent throats opening to the central, annular zones of the retarder plates marginally overlapped by the deflector units, all in functional and structural correspondence with the similar elements of the fixed structure organization first described.

Operately complementary to the fixed structure of the large-diameter kiln in the space between the retarder plates and deflector array of the latter, a movable structure closely analogous to that hereinabove detailed is comprised from concentric, annular rings 35′, 36′ 55 and 56 adapted to register, respectively, with the median circles of the retarder plates 26′, 27′, 51 and 52, which rings, in a coplanar assembly of uniform axial extent, are fixedly correlated and integrated by means of radial arms 37′, and 38′, and bracing struts 39′, substantially as explained in connection with the movable structure of the embodiment first described. In the adaptation appropriate to function in a kiln of large diameter, the rings 35′, 36′, 55 and 56 of the movable structure are expediently formed as beams fabricated from structural steel shapes, as indicated, and the supplementing arms 38′ of the movable structure close inwardly of the latter to connection with the arms 37′, but, in general, the movable structure co-actable with a large-diameter kiln is in most structural and all functional respects the same as that of the embodiment first described and is characterized by an extension of the outer end of each arm 37′ and 38′ to inwardly-adjacent registration with a port 40′ intersecting the shell 30′. Orbitally actuable between and out of contact with the retarder plate assembly and the deflector unit array of the fixed structure, the movable structure adapted for coaction with that of a large-capacity kiln as shown and described may be supported by the oscillable rigid links 41 of the first-described embodiment, but is represented as operatively carried by crank-type supports susceptible of substitution for the links 41 in any practical installation of the improved grate exemplifying the principles of the invention. In a number appropriate to accommodate the operating requirements of a given installation and in registration with and operative extension through the intervals separating and intersecting the retarder plate members, the crank-type supports for the movable structure of the large-diameter kiln as illustrated are alike characterized by a stem portion 57 rotatable about its vertical-disposed axis in a mounting fixedly carried on and above an element, such as a beam 24′, of the fixed frame support for the kiln, a crank arm 58 carried by and in perpendicular relation with the upper end of the stem 57, and a spindle 59 rotatable about its vertically-disposed axis in upward extension from the crank arm 58 parallel to and in an eccentric relation with stem 57. In a practical arrangement typified by FIGURE 7, crank-type supports having a diameter of eccentric action no greater than the width of the intervals separating the retarder plates, are provided to operate through the central aperture of the retarder plate 26' in fixed connection of the upper end of the spindle 59 with the center of the movable structure represented by the junction of the arms 37', to operate in engagement through the interval separating the retarder plates 27' and 51 in fixed engagement of the upper end of the spindle 59 with the zone of each arm 37' and 38' immediately thereabove, and to similarly engage operatively through the interval separating the plates 51 and 52 in like attachment of the upper ends of the spindles 59 with the appropriate zones of each arm 37' and 38'. Supported as shown and described, the movable structure of the large-diameter kiln is obviously conditioned for orbital actuation relative to the fixed structure to which it is complementary in the identical manner and to accomplish the identical purposes amplified in relation to the movable structure of the first-described embodiment; a proper correlation of the angular disposition of the crank arms 58 of the support units being, of course, understood. As in the case of the arrangement and adaptation first described, the movable structure represented in connection with the large-diameter kiln may be powered for actuation by means of hydraulic units 45' hingedly mounted, as at 46', on fittings carried by the outer ends of frame bays 44', whereof the piston rods 47' are connected by rigid links 48' hingedly engaged, as at 49', between each piston rod and the end of an arm 37' or 38' substantially aligned therewith through a port 40'; said rams 45' being associated by means of flow lines 50' in and for successive actuation by a pressure fluid system as previously set forth to effect appropriate orbital actuation of the movable structure and consequent discharge of solids material uniformly and continuously over the peripheral margins of the retarder plate units.

The improved discharge grate of the organization, in any practical embodiment typified by the views of the drawings, is expedient of use in various ways to regulate, control, and direct introduction of treating fluids to the charge of material within the kiln. As should be obvious, the hopper bottom 25 or 25' may be organized to close the lower end of the kiln with provision for discharge, as by means of rotary valves and gates conventionally utilized for the purpose, of the solids material received therein, and as so organized, the hopper bottom may be supplied with appropriate treating fluid, such as heated gas, in any feasible manner, whereby to effect a regulable supply of treating fluid applied for uprise through the grate organization and the charge of material thereabove; in which arrangement it is feasible to close a path for fluid escape through the ports 40 or 40' by means of bellows-type sleeves 60 surrounding the links 48 or 48' in connection between outer ends of said links and the shell areas surrounding the ports. Alternative or supplemental to introduction of treating fluids to and through the hopper bottom of the kiln, lower base areas of the skirt, cone, and deflector unit components of the fixed structure may be closed, as indicated at 61, to constitute said components as ducts whereinto the treating fluids may be introduced, as through flow lines 62 communicating therewith from any suitable fluid source or supply through the openings in or intervals separating the retarder plates, in which event the components functioning as ducts may be provided with ports or vents, not shown, disposed in number and arrangement to direct flow of fluids to and for dissemination throughout the kiln charge in any preferred manner. Constitution of the fixed structure deflector components to function as ducts for direct delivery of treating fluids in the manner just described may be utilized, when appropriate, for delivery of the treating fluids to the kiln charge at any appropriate zone, or zones, transverse of the kiln above the grate organization; it being entirely feasible to supply vertical risers 63 fixedly upstanding in any selected number and angular spacing from and in interior communication with upper zones of the deflector components and to branch the upper end of each riser 63 as divergent tubular arms 64 each terminating against and interiorly communication with a circular header 65 appropriately perforated for escape of treating fluids thence into the kiln charge and desirably capped by annular deflectors 66 effective to divide and maintain flow of the kiln charge imposed thereon.

Organized in any particular operative correlation typified by the views of the drawings, the improved discharge grate in its specific adaptation to efficient coaction with transversely-circular shaft kilns represents a unique and advantageous application of established principles characterized by practicality, high adaptability, amenability to selective regulation and control, and facility of expedient diverse constitution.

Since changes, variations, and modifications in the form, construction and arrangement of the elements shown and described may be had without departing from the spirit of our invention, we wish to be understood as being limited solely by the scope of the appended claims, rather than by any details of the illustrative showing and foregoing description.

We claim as our invention:

1. The combination with a transversely-circular shaft kiln having an axially-vertical tubular shell adapted to confine a charge of discrete solids material for continuous gravity flow therethrough and a fixed structure defining coplanarly spacedly-concentric, annular throats and complementary coplanarly spacedly-concentric, annular intervals spacedly subjacent and radially offset relative to said throats transversely obstructing a lower portion of said shell to inhibit flow of material directly therethrough, of a unitary movable structure characterized by fixedly-associated concentric rings respectively registrable with said throats freely actuable transversely of the shell within the zone of the fixed structure separating said throats and intervals, means supporting said movable structure for oscillation transversely of the shell independently of and out of contact with elements of said fixed structure, and power means engaging said movable structure for actuation thereof orbitally and eccentrically of said shell to correspondingly traverse said ring components across respectively-subjacent areas of the fixed structure separating adjacent annular intervals of the latter.

2. The combination with a transversely-circular shaft kiln having an axially-vertical tubular shell adapted to confine a charge of discrete solids material for continuous gravity flow therethrough and a fixed structure defining coplanarly spacedly-concentric, annular throats and complementary coplanarly spacedly-concentric, annular intervals spacedly subjacent and radially offset relative to said throats transversely obstructing a lower portion of said shell to inhibit flow of material directly therethrough, of a unitary movable structure characterized by fixedly-associated concentric rings respectively registrable with said throats shiftable transversely of the shell within the zone of the fixed structure separating said throats and intervals, generally-vertical, oscillable links supporting said movable structure independently of and out of engagement with elements of said fixed structure, and power means engaging said movable structure for actuation thereof orbitally and eccentrically of said shell to correspondingly traverse said ring components across respectively-subjacent areas of the fixed structure separating adjacent annular intervals of the latter.

3. The combination with a transversely-circular shaft kiln having an axially-vertical tubular shell adapted to confine a charge of discrete solids material for continuous gravity flow therethrough and a fixed structure defining coplanarly spacedly-concentric, annular throats and complementary coplanarly spacedly-concentric, annular intervals spacedly subjacent and radially offset relative to said throats transversely obstructing a lower portion of said shell to inhibit flow of material directly therethrough, of a unitary movable structure characterized by fixedly-associated concentric rings respectively registrable with said throats shiftable transversely of the shell within the zone of the fixed structure separating said throats and intervals, axially vertical cranks supporting said movable structure independently of and out of engagement with elements of said fixed structure, and power means engaging said movable structure for actuation thereof orbitally and eccentrically of said shell to correspondingly traverse said ring components across respectively-subjacent areas of the fixed structure separating adjacent annular intervals of the latter.

4. The combination with a transversely-circular shaft kiln having an axially-vertical tubular shell adapted to confine a charge of discrete solids material for continuous gravity flow therethrough and a fixed structure defining coplanarly spacedly-concentric, annular throats and complementary coplanarly spacedly-concentric, annular intervals spacedly subjacent and radially offset relative to said throats transversely obstructing a lower portion of said shell to inhibit flow of material directly therethrough, of a unitary movable structure characterized by fixedly-associated concentric rings respectively registrable with said throats shiftable transversely of the shell within the zone of the fixed structure separating said throats and intervals, means supporting said movable structure for oscillation transversely of the shell independently of and out of contact with elements of said fixed structure, a plurality of arms fixedly radially of said movable structure in like extension outwardly beyond the associated ring of greatest diameter, a power unit exterior of the shell operatively connected with and effective for longitudinal shift of each said arm, and means operatively correlating the separate said power units for cyclic actuation effective to impel the movable structure orbitally and eccentrically of said shell to correspondingly traverse said ring components across respectively-subjacent areas of the fixed structure separating adjacent annular intervals of the latter.

5. The combination with a transversely-circular shaft kiln having an axially-vertical tubular shell adapted to confine a charge of discrete solids material for continuous gravity flow therethrough and a fixed structure defining coplanarly spacedly-concentric, annular throats and complementary coplanarly spacedly-concentric, annular intervals spacedly subjacent and radially offset relative to said throats transversely obstructing a lower portion of said shell to inhibit flow of material directly therethrough, of a unitary movable structure characterized by fixedly-associated concentric rings respectively registrable with said throats shiftable transversely of the shell within the zone of the fixed structure separating said throats and intervals, a plurality of arms fixed radially of said movable structure in like extension outwardly beyond the associated ring of greatest diameter, generally-vertical, oscillable links engaging said arms for shiftable support of said movable structure independently of and out of contact with elements of the fixed structure certain of said links being operatively accommodated through intervals characterizing the fixed structure, a power unit exterior of the shell connected to and for longitudinal shift of each said arm, and means operatively correlating the separate said power units for cyclic actuation effective to impel the movable structure orbitally and eccentrically of said shell to correspondingly traverse said ring components across respectively-subjacent areas of the fixed structure separating adjacent annular intervals of the latter.

6. The combination with a transversely-circular shaft kiln having an axially-vertical tubular shell adapted to confine a charge of discrete solids material for continuous gravity flow therethrough and a fixed structure defining coplanarly spacedly-concentric, annular throats and complementary coplanarly spacedly-concentric, annular intervals spacedly subjacent and radially offset relative to said throats transversely obstructing a lower portion of said shell to inhibit flow of material directly therethrough, of a unitary movable structure characterized by fixedly-associated concentric rings respectively registrable with said throats shiftable transversely of the shell within the zone of the fixed structure separating said throats and intervals, a plurality of arms fixedly radially of said movable structure in like extension outwardly beyond the associated ring of greatest diameter, axially-vertical cranks engaging said arms for shiftable support of said movable structure independently of and out of contact with elements of the fixed structure, certain of said cranks being operatively accommodated through intervals characterizing the fixed structure, a power unit exterior of the shell connected to and for longitudinal shift of each said arm, and means operatively correlating the separate said power units for cyclic actuation effective to impel the movable structure orbitally and eccentrically of said shell to correspondingly traverse said ring components across respectively-subjacent areas of the fixed structure separating adjacent annular intervals of the latter.

7. In a discharge grate for a transversely-circular shaft kiln characterized by an axially-vertical tubular shell adapted to confine a charge of discrete solids material for continuous gravity flow therethrough having a spacedly-concentric, coplanar array of deflector units fixed in and transversely obstructing a lower portion of the shell, whereby to establish a radially-spaced succession of annular throats opening axially of the shell therebetween, and a spacedly-concentric, coplanar assembly of flat, annular retarder plates spacedly subjacent the deflector unit array in a radial correlation with the latter such as to register the annular openings in and intervals between said plates beneath the several deflector units, the improvement comprising a movable structure characterized by fixedly-associated concentric rings respectively registrable with the throats between the several deflector units freely actuable transversely of the shell between elements of the deflector unit array and retarder plate assembly, means supporting said movable structure for oscillation transversely of the shell independently of and out of contact with elements of the deflector unit array and retarder plate assembly, and power means engaging said movable structure for actuation thereof orbitally and eccentrically of said shell to correspondingly traverse said ring components across respectively-subjacent retarder plate areas.

8. The organization according to claim 7, wherein the movable structure is an integrated assembly of radial arms fixedly intersecting concentric rings of like axial extent less than the separation between adjacent portions of the deflector unit array and retarder plate assembly, and the means supporting said movable structure comprise generally-vertical, oscillable links affixed at their upper ends to said arms and in part operatively accommodated through the intervals separating said plates.

9. The organization according to claim 7, wherein the movable structure is an integrated assembly of radial arms fixedly intersecting concentric rings of like axial extent less than the separation between adjacent portions of the deflector unit array and retarder plate assembly, and means supporting said movable structure comprise axially-vertical cranks affixed at their upper ends to said arms and in part operatively accommodated through the intervals separating said plates.

10. The organization according to claim 7, wherein individual deflector units of the coplanar array thereof are constituted as closed, hollow ducts adapted for the circulation of treating fluids therethrough, and like, hollow risers correspondingly upstand in angularly-spaced relation vertically from fixed, interiorly-communicating association with appropriate so-constituted ducts to terminate in fluid-delivery outlets defining a common plane transverse of the shell upwardly from the deflector unit array.

11. The organization according to claim 7, wherein individual deflector units of the coplanar array thereof are constituted as closed, hollow ducts adapted for the circulation of treating fluids therethrough, like, hollow risers correspondingly upstand in angularly-spaced relation vertically from fixed, interiorly-communicating association with appropriate so-constituted ducts, and upper portions of said risers are formed as upwardly-divergent, hollow arms terminating in fluid-delivery outlets defining a common plane transverse of the shell spacedly above the deflector unit array.

12. The organization according to claim 7, wherein said movable structure includes a plurality of like radial arms similarly terminating in extensions fixed radially of and angularly spaced apart exteriorly about the structure ring of greatest diameter, and the power means for actuation of said movable structure is an operatively-synchronized array of like power units exteriorly of the shell individually connected with and for longitudinal shift of each said extension.

13. The organization according to claim 7, wherein said movable structure includes a plurality of like radial arms similarly terminating in extensions fixed radially of and angularly spaced apart exteriorly about the structure ring of greatest diameter, and the power means for actuation of said movable structure is an array of like power units exteriorly of the shell individually connected with and for longitudinal shift of each said extension susceptible of operative correlations in a synchronous, progressive succession of individual operation.

References Cited in the file of this patent

UNITED STATES PATENTS

| | | |
|---|---|---|
| 1,460,067 | Laird | June 26, 1923 |
| 1,598,451 | Saathoff | Aug. 31, 1926 |
| 1,716,572 | Wright | June 11, 1929 |
| 2,751,212 | McIntire | June 19, 1956 |

FOREIGN PATENTS

| | | |
|---|---|---|
| 501,249 | Great Britain | Feb. 23, 1939 |